May 21, 1957 W. F. J. FIENUP ET AL 2,793,126
DOUGH PACKAGE AND METHOD OF MAKING SAME
Filed March 16, 1953 6 Sheets-Sheet 1
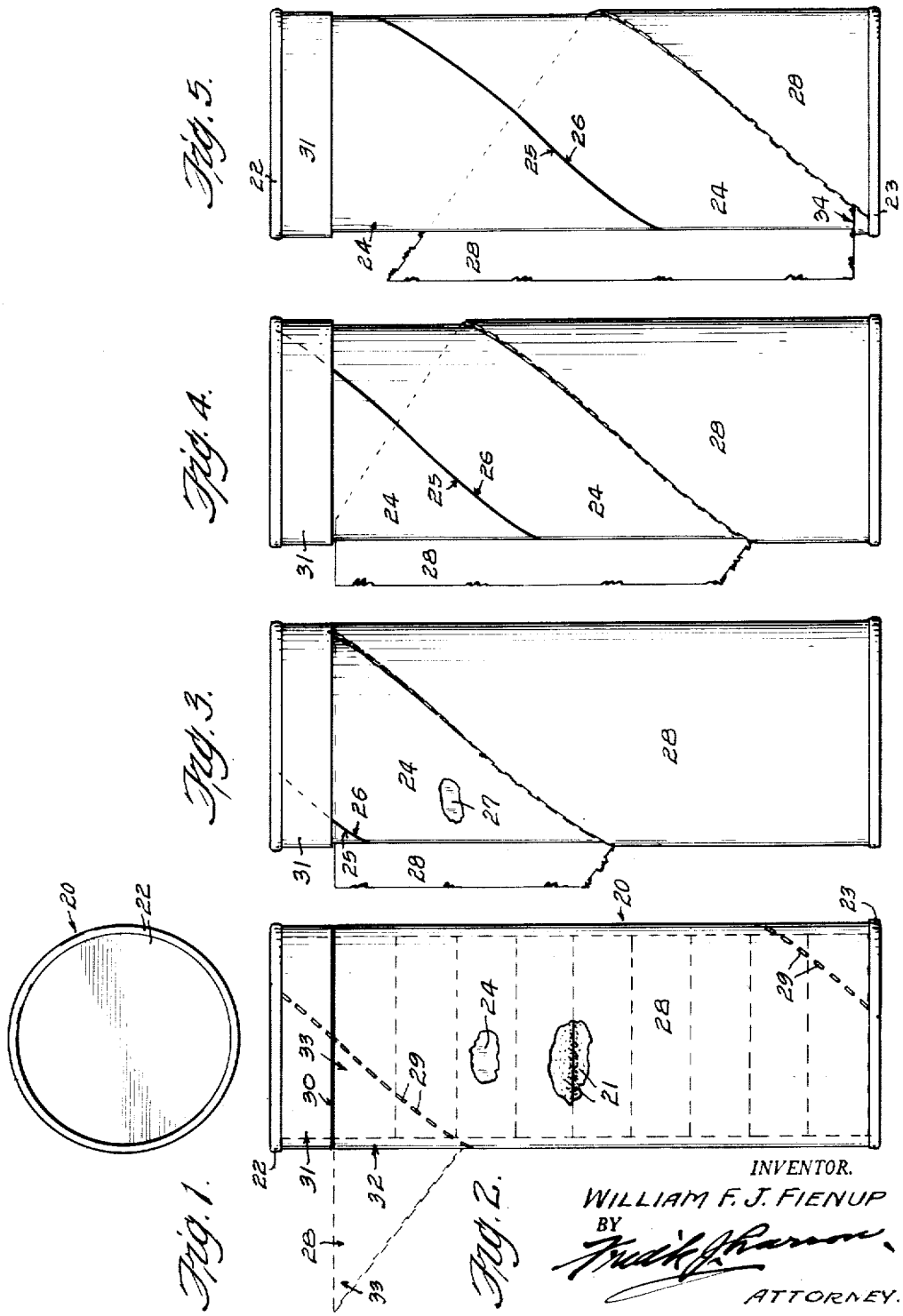
INVENTOR.
WILLIAM F. J. FIENUP
BY
ATTORNEY.

May 21, 1957     W. F. J. FIENUP ET AL     2,793,126
DOUGH PACKAGE AND METHOD OF MAKING SAME

Filed March 16, 1953     6 Sheets-Sheet 2

INVENTOR.
WILLIAM F. J. FIENUP
BY
ATTORNEY.

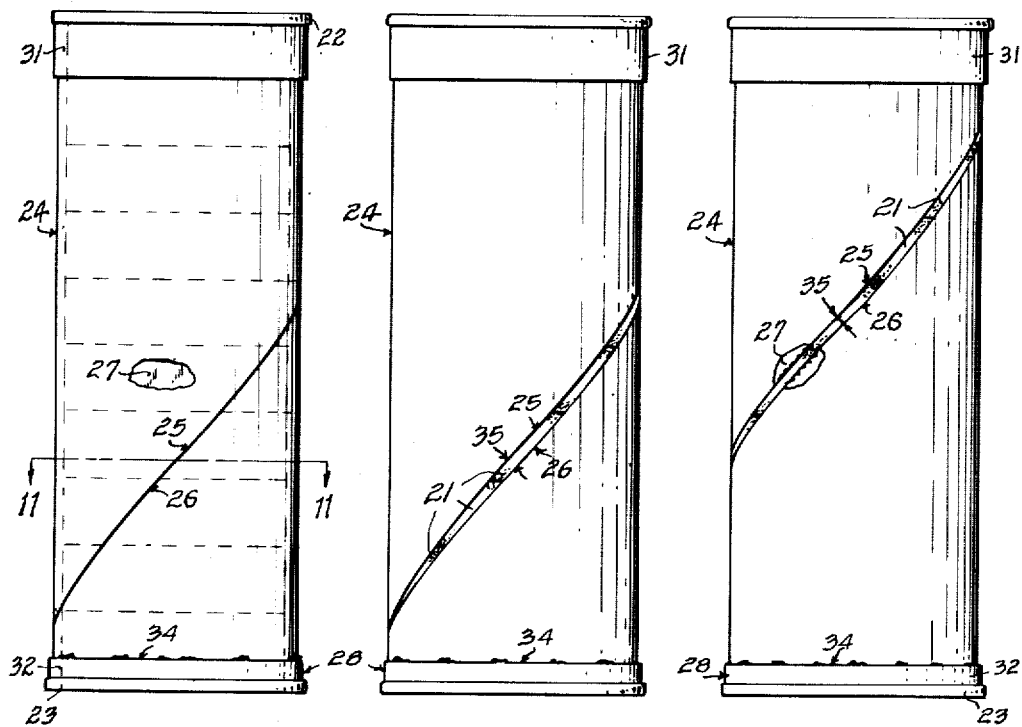
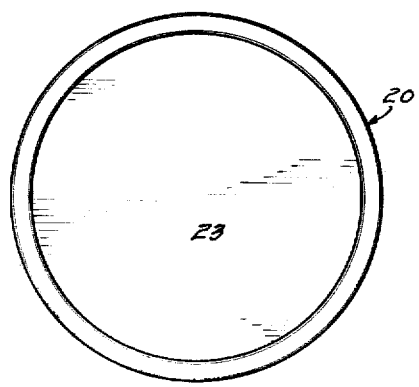
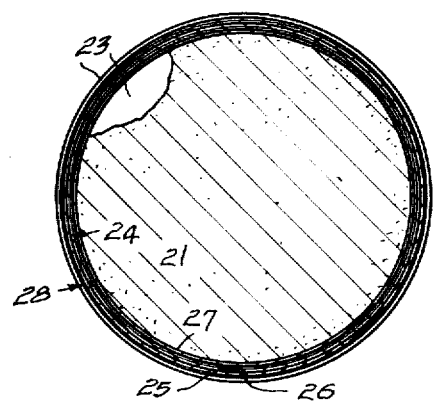

May 21, 1957 W. F. J. FIENUP ET AL 2,793,126
DOUGH PACKAGE AND METHOD OF MAKING SAME
Filed March 16, 1953 6 Sheets-Sheet 4

INVENTOR.
WILLIAM F. J. FIENUP
BY
ATTORNEY.

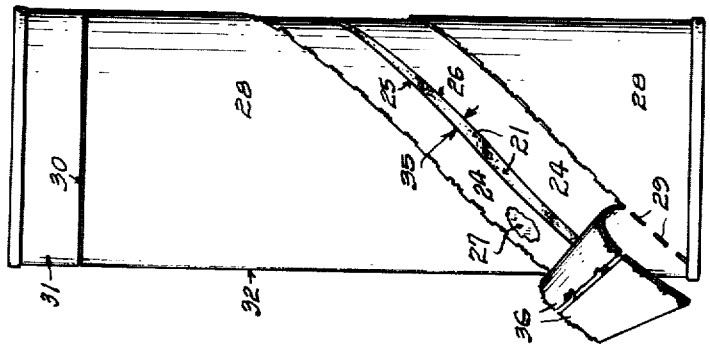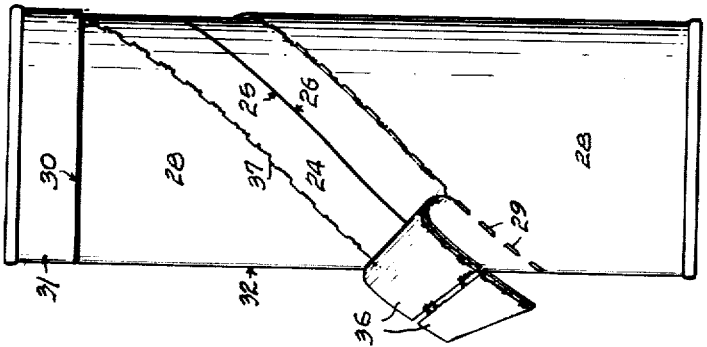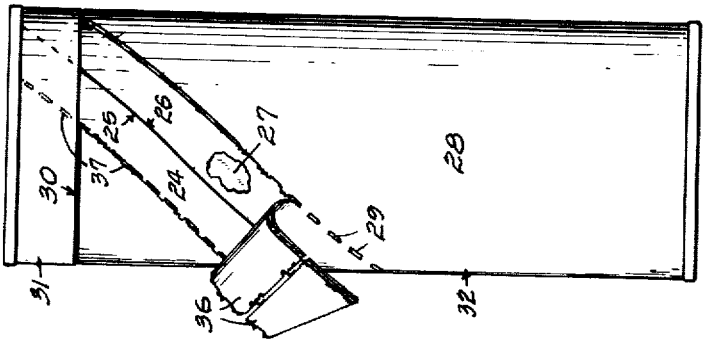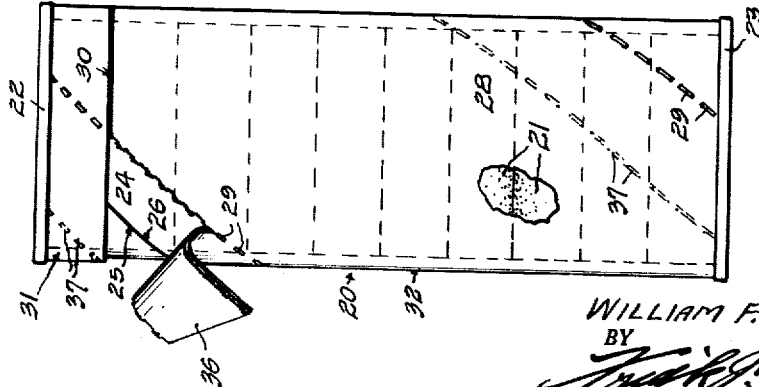

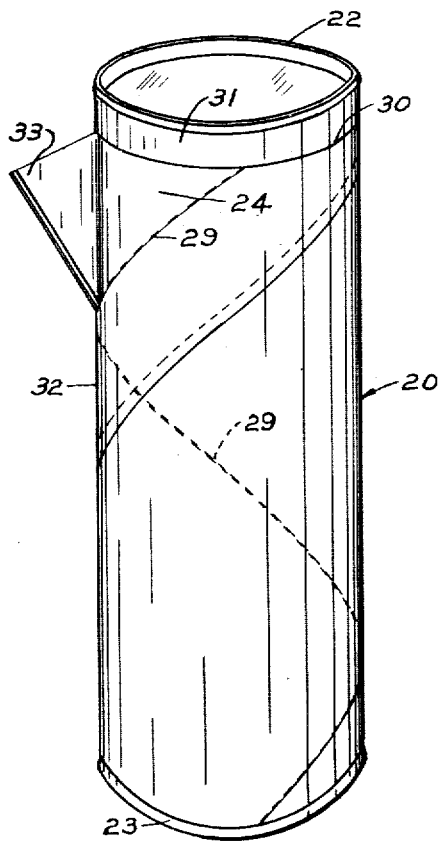

United States Patent Office 2,793,126
Patented May 21, 1957

2,793,126
DOUGH PACKAGE AND METHOD OF MAKING SAME

William F. J. Fienup, St. Louis, Mo., Hamilton W. Putnam, Jeffersonville, Ind., and Ross A. Easter, Minneapolis, Minn., assignors, by direct and mesne assignments, to R - C Can Company, St. Louis, Mo., a corporation of Missouri Application March 16, 1953, Serial No. 342,673

14 Claims. (Cl. 99—172)

This invention relates to a complete merchandise package and a container constituting a part thereof.

In one embodiment of the invention, it is the object thereof to provide a merchandise package for preformed, preleavened biscuit bodies prepared ready for baking, which is suitable for distribution through the usual food merchandising channels, and which package does not require the use of any tool to open it for removal of its contents.

Another object of the invention resides in the provision of a merchandise container constituting a part of a package which consists of a removable reinforcing outer body wrapping, an inner body wrapping upon which the outer body wrapping is superposed, but not adhesively connected, a suitable liner sealed to and facing the inner body wrapping and suitable end closures, and within which container the dough bodies are protected and sealed against excessive loss of water and leavening gas.

A further and important object of the invention resides in the provision of a merchandise package wherein all that is necessary to do to open the package is to remove, by unwinding, a portion of the reinforcing outer body wrapping to allow the lined inner body to expand, for opening a helical body seam forming a helical separation or rupture line between the abutting edges to provide a gap between the ends of the package, by pressure generated within the inner body after it has been exposed to room temperature for a short time, or, if preferred to open the package immediately after a portion of the outer body has been removed, to manually rupture the liner at some convenient point at the seam of the abutting edges and to twist the package to helically tear the liner and separate the abutting edges. A liner may be provided of any suitable material and need not be metal foil.

I achieve the foregoing objects and such other advantages as may hereinafter appear and pointed out, in the manner illustratively exemplified in the accompanying drawings, wherein:

Fig. 1 is a top end view of the merchandise package.

Fig. 2 is a side elevation of the package embodying one form of the invention and showing in dash lines to the left of the package the first step in unwinding the outer body of the package.

Fig. 3 is a side elevation of the package rotated ninety degrees to the showing in Fig. 2 to partly show the inner body.

Fig. 4 is a side elevation of the package rotated one-hundred eighty degrees to the showing in Fig. 2 to show more of the inner body.

Fig. 5 is a side elevation of the package rotated two hundred seventy degrees to the showing in Fig. 2 and showing still more of the inner body.

Fig. 7 is a side elevation of the package with the major portion of the outer body unwound from the inner body and showing the torn edge near the bottom end of the package, the helical abutting edges of the inner body being shown as non-separated.

Fig. 8 is a side elevation of the package with the outer body removed, as shown in Fig. 7, and showing the package as having expanded to rupture the foil liner of the inner body and separate the helical abutting edges of the inner body to provide a gap to expose the contents of the package.

Fig. 9 is a view similar to Fig. 8, but rotated ninety degrees relative thereto and showing an upward continuation of the gap caused by the separation of the abutting edges of the inner body.

Fig. 10 is an enlarged bottom end view of the package.

Fig. 11 is a sectional view taken on line 11—11 of Fig. 7 looking in direction of the arrows.

Fig. 16 is a view similar to Fig. 2, but showing a tearing strip defined by spaced tear lines with the abutting edges of the inner body.

Fig. 17 shows the package rotated ninety degrees to the showing in Fig. 16.

Fig. 18 shows the package rotated one-hundred eighty degrees to the showing in Fig. 16.

Fig. 19 shows the package rotated two hundred seventy degrees to the showing in Fig. 16 and showing the liner broken and the abutting edges of the inner body separated.

Fig. 20 is a side perspective view of a container showing the two-ply construction of the outer reinforcing body wrapping in partially removed position.

Figure 6:
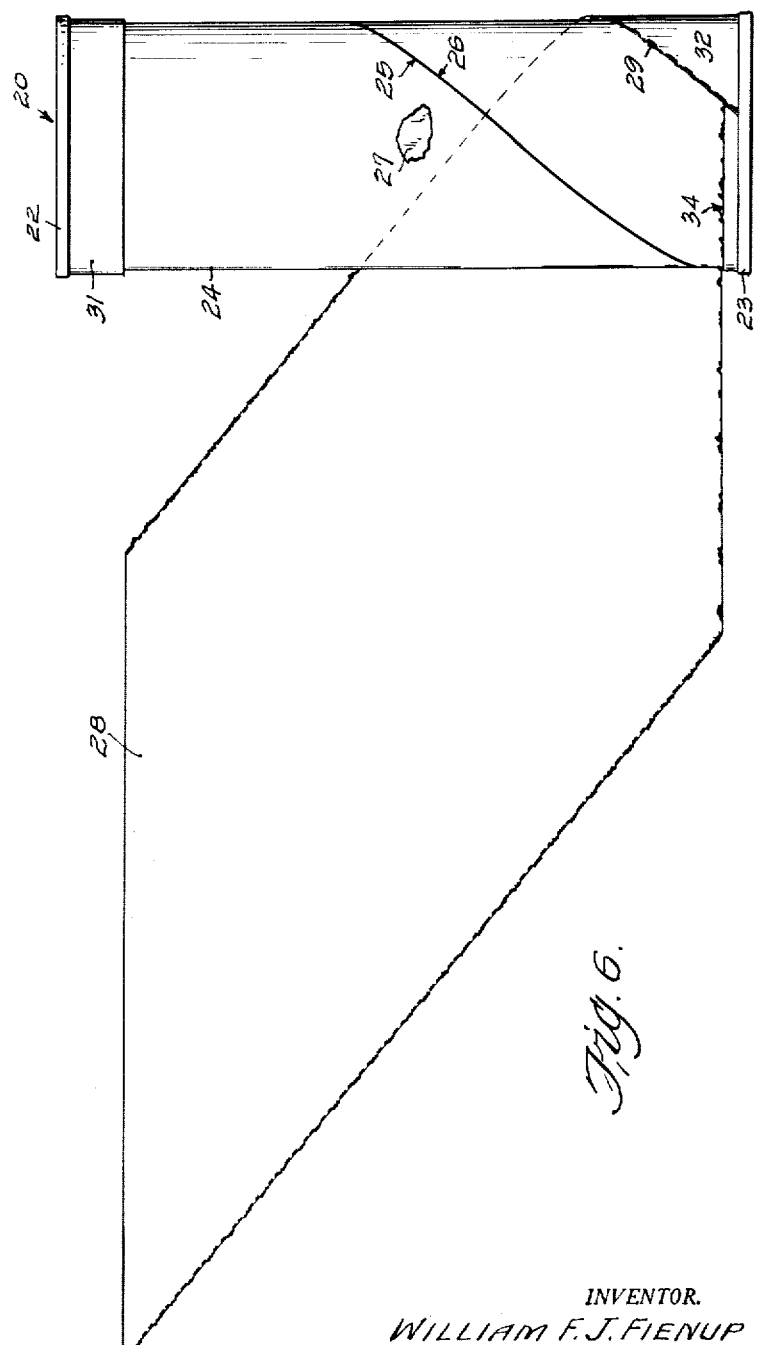
Fig. 6 is a side elevation of the package rotated three hundred sixty degrees to the showing in Fig. 2 and showing the outer wrapping or body nearly completely unwound from the inner body.
Figure 12:
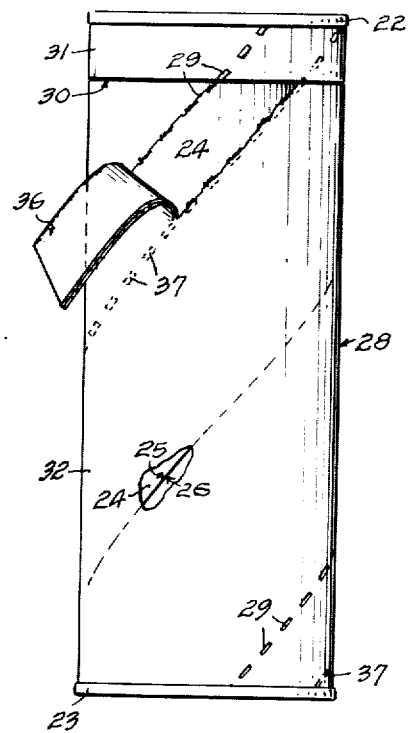
Fig. 12 is a modification of the invention illustrating a helical tear strip or tongue of the outer body which can be removed from the outer body to weaken the body of the package.
Figure 13:
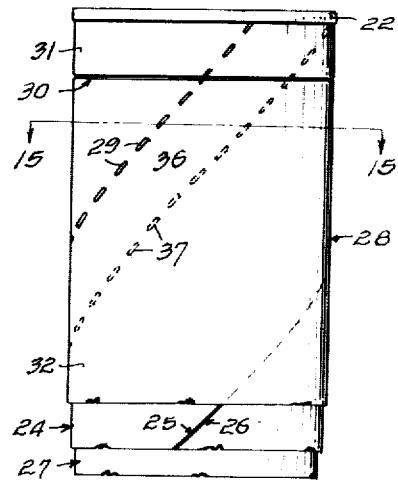
Fig. 13 is a fragmentary cross sectional view of the modified form of outer body showing the tear strip or tongue from the outside.
Figure 15:
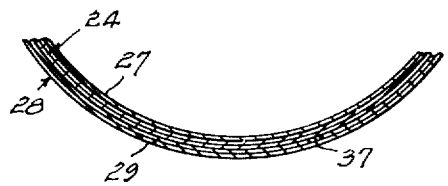
Fig. 15 is a sectional view taken on line 15—15 of Fig. 13.
Figure 14:
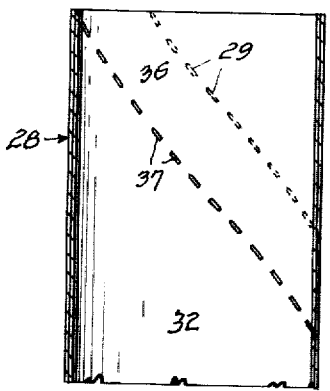
Fig. 14 is a view similar to Fig. 13 showing the tear strip or tongue from the inside of the outer body.

The merchandising package illustrated comprises a cylindrical container designated, generally, as 20 including merchandise 21 illustrated in one embodiment as a stack of ten bodies, or discs of preformed, preleavened biscuit dough which is expanded to fill the container. The two ends of the container are closed by means of the usual metal end closures indicated as 22 and 23 crimped to the outer wall of the container, as is usual in the paper can industry.

The container comprises a helically wound fibrous tubing which is cut into sections of desired lengths to form the cylindrical wall of the instant package.

The tubing from which the container is made, consists of an inner helically wound wrapping, or body 24 preferably of two ply fibrous material with margins of juxtaposed turns that are readily separable from each other, or in other words, has helically disposed abutting edges 25 and 26.

The inner face of the inner wrapping, or body 24 is faced with a suitable material serving as a liner 27 which is suitably sealed to adhere to the wrapping, or body 24. The liner may be convolutely wound, or rolled with its margins overlapping, thus it inwardly covers the line, or seam between the abutting edges 25 and 26 of the inner wrapping, or body 24.

The separation or rupture line, or seam formed by the abutting edges of the material forming the helically wound inner wrapping, or body 24, is outwardly covered by a helically wound adhesively bound two-ply outer fibrous wrapping, or body which is indicated as 28. The inner and outer wrappings, or bodies 24 and 28 are not adhesively bound together, but the outer wrapping, or body 28 is merely superposed upon the helically wound inner wrapping, or body 24 and the outer ply of body 28 is adhesively bound in overlapped relation around the inner ply thereof. The end closures 22 and 23, top and bottom closures respectively, are crimped to the outer face of the outer wrapping, or body 28 and are clamped tightly against the foil liner 27 with the ends of the inner wrapping, or body 24 disposed between the liner and the outer wrapping, or body 28.

The outer wrapping, or fibrous body 28 is provided with a helically disposed line of semi-perforations 29, that is perforations that do not go all the way through the wall of the outer body, providing thereby a tear line or peeling edge parallel to the helically disposed abutting edges 25 and 26 of the inner wrapping, or body 24 and lying in overlapping relationship to the abutting separable edges 25 and 26 of the inner wrapping, or body 24. There is no adhesive between the inner and outer tubular bodies 24 and 28 of the container body.

The outer tubular fibrous body 28 is severed at one end preferably, although not necessarily the top end thereof by means of a circumferential cut 30 which forms a separation line and actually divides, or separates the outer body 28 into two sections such as a short upper outer body section 31 and lower, or relatively long lower outer body section 32.

When the long lower outer body section 32 is unwound, or unwrapped from the inner body 24, it is torn along the helical line of semi-perforations 29. The angular upper end portion indicated 33 of the long lower section 32 of the outer wrapper, or body 28 may be easily picked up by the nail of the forefinger to start, or initiate the helical tearing operation along the tear line of the outer wrapper, or body member. After the long lower section 32 of the outer wrapper, or body 28 has been torn, the full length thereof along the tear line, the body section 32 is torn circumferentially adjacent the end closure 23. There is no semi-perforate tear line circumferentially of the lower section 32 of the outer body 28. The material is irregularly torn, as indicated 34 until it is completely torn from the remaining lower section 32 of the outer body 28.

After the long lower section 32 of the outer wrapper, or body 28 has been removed from the package, to remove the inner body from concealment, the package so remaining is allowed to stand for a short period of time at room temperature, or subjected to a temperature higher than room temperature which will accelerate the raising pressure within the package, and when the pressure has reached a stage sufficiently high, it will expand the package, which is minus its outer wrapping, ruptures the foil liner 27 in register with the seam formed by the abutting edges 25 and 26 of the inner body 24, thereby separating the abutting edges 25 and 26 to provide a helical gap 35 extending substantially the full length of the inner body 24 running between the lower end closure 23 and circumferential cut 30, through which gap the contents of the package are exposed, but not discharged therefrom. To remove the contents, one may take hold of both ends of the spirally expanded package and twist the ends of the inner body 24 and foil liner 27 in opposite directions which widens the already formed gap 35 so that the contents may be easily and quickly discharged therefrom through the widened gap 35. Both end closures 22 and 23 remain on the package after it has been helically expanded and the inner foil ruptured. Prior to twisting the ends of the package, the gap 35 is narrow relative to the diameter of the dough bodies, or discs, thus no accident can happen in opening a merchandise package as herein disclosed. This is not so with packages when the wall of the body is cut through with a knife and the safe removal of the contents cannot be controlled due to the pressure within the package.

The fibrous material from which the initial tubing for the container is formed, is relatively wide and the pitch of the helical abutting edges 25 and 26 of the inner body 24, and the helical tear line 29 of the outer body are relatively steep, practically equivalent to the circumference of the container, and of an overlapping relationship so that they are out of register to avoid any weakness in the wall of the tube that internal gas pressure may effect until the lower section 32 of the outer wrapping, or body 28 of the package has been removed from the inner wrapping, or body 24 of the package.

The many advantages of a merchandise package as herein disclosed results from the manually tearing of an outer wrapper, or body along a helical line and then tearing the outer body circumferentially from the package leaving the inner body and liner therefor and contents intact. The unwrapping of the outer body leaves the package ready to open itself after pressure has risen within the package sufficiently high to tear the liner along the entire seam line caused by the helical abutting edges of the inner wrapper, or body 24. When the package, minus the outer wrapper expands, the foil liner 27 ruptures helically and the abutting edges 25 and 26 of the inner wrapping 24 separates but not enough to allow the biscuit dough bodies to pop out of the package. Manually widening the helical body gap 35 by twisting the package from both ends widens the gap sufficiently to remove the contents therefrom by allowing them to fall out, or to remove them by hand.

In a modified form of the invention, a tear strip 36 is provided by providing the inner ply of the two ply outer wrapping, or body 28 with a tear line of semi-perforations 37 parallel with the tear line of semi-perforations 29 arranged only in the outer ply of the outer wrapping, or body 28. Helically tearing the tear strip 36 from the outer body 28 provides a helical gap the width of the tear strip 36, which weakens the wall of the package so that it can be opened to remove biscuit dough bodies or other merchandise, by twisting the package from opposite ends in opposite directions which tears the liner, and separates the abutting edges 25 and 26 of the inner fibrous wrapping, or body 24 to provide a helical wall gap between the end closures of the package for the removal of contents therefrom. In such a quick opening package, many different articles of merchandise could be packed and sealed in for distribution through the proper channels. Obviously this container is particularly adapted for use with preformed plastic materials which when confined exert outwardly directed pressure such as, for example, preleavened and preformed dough products. The term dough as used in this application is hereby defined as including any such materials.

When the helical tear strip 36 is employed in the outer body wrapping 28, the spiral seam between the abutting edges 25 and 26 of inner body 24 is arranged, preferably midway between the tear line perforations 29 and 37 so it will be readily exposed when the tear strip is removed from the outer body.

When it is desired to open a biscuit dough package immediately after removing it from a refrigerator instead of waiting for it to warm up and explode the inner body after the outer body or tear strip has been removed, the liner 27 may be fractured by applying thumb or finger pressure at the helical seam of the abutting edges any where along the helical seam and then twisting the package in opposite directions, from opposite ends thereof, to tear the liner helically from end to end of the seam between the abutting edges and separate the abutting edges to provide a helical gap of sufficient width to remove the contents of the package therethrough.

The many advantages of the invention disclosed will readily suggest themselves to those skilled in the art to which the invention relates.

It is to be understood that the forms of my invention, herewith shown and described, is to be taken as two examples of the same, and that various changes in the shape, size and arrangement of the package parts, or elements may be resorted to, without departing from the spirit of my invention, or the scope of the subjoined claims.

What I claim is:

1. A dough package comprising a container with dough contained therein and constructed to permit said dough to be bodily removed therefrom without mutilation, said container comprising an inner fibrous body forming a generally cylindrical casing and having a generally helical separation line extending substantially the full length thereof and pitched to extend helically around substantially the complete circumference of the container, liner material covering the inner surface of said inner body, an outer reinforcing wrapping superposed about said inner body and detachably held therearound, said outer wrapping having at least a readily detachable peeling edge portion to facilitate unwrapping and removal thereof from the inner body to permit expansion of the inner body by separation at said helical separation line substantially from end to end of the container, and a pair of end closures secured to the ends of the container to positively seal the contents therewithin, said dough being bodily removable from the container without mutilation thereof by grasping the ends of the container and twisting the same in opposite directions to unwrap the inner body from said dough throughout substantially the entire length of the container.

2. The structure set forth in claim 1 and said end closure being respectively clamped to the marginal end portions of the inner body and outer wrapping to securely and positively anchor said closures thereto, at least one of said end closures forming a tearing edge permitting removal of the outer wrapping from the inner body without removal of the end closures from said body.

3. The structure set forth in claim 2 and a circumferential separation line formed in said outer wrapping in closely spaced relation to one of said end closures to insure unwinding from the inner body of the outer wrapper around the complete circumference of the adjacent end of the container.

4. A package for dough products comprising a container with dough contained therein and constructed to permit said dough to be bodily removed therefrom without mutilation, said container comprising an inner body of fibrous sheet material forming a generally cylindrical casing and having a generally helical separation line extending substantially the full length of the container and pitched to extend helically around substantially the complete circumference of the container, liner material covering the inner surface of said inner body, an outer reinforcing wrapping normally held in superposed position about said inner body, at least the portion of said outer wrapping overlying said helical separation line being readily detachable and removable from said inner body to expose said separation line and permit expansion of said inner body by separation at said separation line substantially from end to end of the container, and a pair of end closures secured to the ends of the container to positively seal the contents therewithin whereby the ends of the container may be grasped and twisted in opposite directions to unwrap the inner body from said dough throughout substantially the entire length of the container.

5. The structure set forth in claim 4 and a pair of spaced apart separation lines helically formed in substantially parallel relation in said outer wrapping to define a removable tear strip overlying said helical separation line, at least said tear strip being free and detached from said inner body to permit the same to be readily removable from said outer wrapping and said inner body to expose said separation line and permitting expansion of the inner body by separation thereof at said separation line.

6. A dough package comprising a container with dough contained therein and constructed to permit said dough to be bodily removed therefrom without mutilation, said container comprising an inner fibrous body forming a generally cylindrical casing and having a generally helical separation line extending substantially the full length thereof and pitched to extend around substantially the complete circumference of the container, liner material covering the inner surface of said body, an outer reinforcing wrapping superposed about said inner body and detachable held therearound, said outer wrapping having at least a peeling edge portion readily detachable from the inner body and from the adjacent outer wrapping portion to facilitate unwrapping and removal of said outer wrapping from the inner body to permit expansion of the inner body by separation of said helical separation line substantially from end to end of the container, a pair of end closures secured to the ends of said container to seal the contents therewithin, and said outer wrapping having a circumferential separation line formed therearound in closely spaced relation to one of said end closures to facilitate complete peeling of the outer wrapping around the complete circumference of the container, said container ends being constructed and arranged to be grasped and twisted in opposite directions after unpeeling of the outer wrapping to unwrap the inner body from said dough throughout substantially the entire length of the container.

7. A dough package comprising a container with dough contained therein and constructed to permit said dough to be bodily removed therefrom without mutilation, said container comprising an inner fibrous body helically formed into a generally cylindrical casing having a generally helical butt joint forming a separation line and extending the full length of the container and pitched to extend helically around substantially the complete circumference of the container, liner material covering the inner surface of said body member, an outer reinforcing wrapping superposed about said inner body and detachably held therearound, said outer wrapping having at least a peeling edge portion readily detachable from the adjacent outer wrapping and from the inner body to facilitate peeling off and removal of the outer wrapping from the inner body to expose said separation line and permit expansion of said inner body by separation along said helical separation line from substantially one end of the container to the other, and a pair of end closures secured to the ends of the container to positively seal the contents therewithin, said dough being bodily removable from the container without mutilation thereof by grasping the ends of said container and twisting the same in opposite directions to unwrap the inner body from said dough throughout substantially the entire length of the container.

8. The structure set forth in claim 7 and said outer wrapping being helically wound about said inner body with the edges thereof forming a helical butt joint out of register with said separation line of the inner body, and said outer wrapping including an outer ply detachably adhesively holding the same in superposed relation around said inner body.

9. The structure set forth in claim 8 and said outer ply having a helical weakness line in registration with the helical butt joint of said inner ply to provide a helical tear line for removal of the outer wrapping from the inner body.

10. A dough package comprising a container with dough contained therein and constructed to permit said dough to be bodily removed therefrom without mutilation, said container comprising a lined inner fibrous body forming a generally cylindrical casing and having a generally helical separation line extending substantially the full length thereof and pitched to extend helically around substantially the complete circumference of the container, an outer reinforcing wrapping superposed about said inner body, said outer wrapping having a helical tear line out of register with said helical separation line permitting the container to be opened substantially the full length thereof at said separation line, and a pair of end closures positively clamped at the ends of the container to confine the contents therewithin, said dough being bodily removable from the container without mutilation thereof by grasping the container ends and twisting the same in opposite directions to unwrap the container from the dough throughout substantially the entire length of the package.

11. The structure set forth in claim 10 and said helical tear line consisting in a helical line of perforations to permit said outer wrapper to be helically split from end to end.

12. The structure set forth in claim 11 and at least the portion of said inner body and said outer wrapping disposed between the separation line and said perforated tear line being detached and free one from the other.

13. The method of packaging dough comprising winding a lined inner fibrous body to provide a generally cylindrical casing, forming a helical separation line in said inner body, said separation line extending substantially the full length of the body and pitched to extend helically around substantially the complete circumference thereof, superposing an outer wrapping about said inner body in a manner to permit removal of said wrapping from said body, and permanently closing the ends of said casing with the dough confined therewithin, said removable outer wrapping and said helical separation line permitting said dough to be bodily removed from the casing without mutilation of the dough shape by grasping the ends of the casing after removal of the outer wrapping and twisting the same in opposite directions to unwrap the inner body from the dough throughout substantially the entire length of the casing.

14. The method of packaging dough comprising helically winding a lined inner fibrous body to provide a generally cylindrical casing with the adjacent edges of said body being abutted to form a helical separation line in said body extending from one end of the casing to the other and pitched to extend helically around substantially the complete circumference of the casing, winding an outer wrapping around said inner body, forming a helical tear line in said outer wrapping out of register with said helical separation line, and permanently closing the ends of the casing with the dough confined therewithin, said helical separation line and tear line permitting said dough to be bodily removed from the casing without mutilation of the dough by grasping the casing ends and twisting the same in opposite directions to unwrap the casing from the dough throughout substantially the entire length of the casing after said separation line and said tear line have been opened.

References Cited in the file of this patent
UNITED STATES PATENTS

| | | |
|---|---|---|
| 1,436,754 | Chadwick | Nov. 28, 1922 |
| 1,922,565 | Adair | Aug. 15, 1933 |
| 1,936,417 | Ware | Nov. 21, 1933 |
| 1,988,091 | Schumacher | Jan. 15, 1935 |
| 2,009,539 | Wootton | July 30, 1935 |
| 2,051,923 | Vogt | Aug. 25, 1936 |
| 2,215,705 | Lenz | Sept. 24, 1940 |
| 2,478,618 | Armstrong et al. | Aug. 9, 1949 |
| 2,681,284 | Graves | June 15, 1954 |
| 2,695,847 | Fisher | Nov. 30, 1954 |

Notice of Adverse Decision in Interference

Interference No. 92,235 involving Patent No. 2,793,126, W. F. J. Fienup, H. W. Putman and R. A. Easter, DOUGH PACKAGE AND METHOD OF MAKING SAME, final judgment adverse to the patentees was rendered June 30, 1966, as to claims 1, 4, 5, 7, 10, 11 and 12.

[*Official Gazette October 25, 1966.*]